(12) United States Patent
Hol (10) Patent No.: US 12,478,226 B2
(45) Date of Patent: Nov. 25, 2025

(54) METHOD AND DEVICE FOR REMOVING A CHEMICAL SUBSTANCE FROM HUMAN EXCRETA

(71) Applicant: BEAM-IP B.V., Beuningen (NL)

(72) Inventor: Alex Hol, Beuningen (NL)

(73) Assignee: BEAM-IP B.V., Beuningen (NL)

( * ) Notice: Subject to any disclaimer, the term of this patent is extended or adjusted under 35 U.S.C. 154(b) by 376 days.

(21) Appl. No.: 18/001,916

(22) PCT Filed: Jun. 18, 2021

(86) PCT No.: PCT/NL2021/050387
§ 371 (c)(1),
(2) Date: Dec. 15, 2022

(87) PCT Pub. No.: WO2021/256933
PCT Pub. Date: Dec. 23, 2021

(65) Prior Publication Data
US 2023/0233040 A1    Jul. 27, 2023

(30) Foreign Application Priority Data

Jun. 19, 2020  (NL) .................................... 2025874

(51) Int. Cl.
*A47K 11/02*      (2006.01)
*B01D 35/30*     (2006.01)
(Continued)

(52) U.S. Cl.
CPC ............. *A47K 11/02* (2013.01); *B01D 35/30* (2013.01); *B01D 61/18* (2013.01); *B01D 61/20* (2013.01);
(Continued)

(58) Field of Classification Search
CPC ..................................................... A47K 11/02
See application file for complete search history.

(56) References Cited

U.S. PATENT DOCUMENTS

| 4,229,300 A | 10/1980 | Benes et al. |
| 5,005,457 A * | 4/1991 | Thornton, Jr. ........... B64G 1/60 83/649 |

(Continued)

FOREIGN PATENT DOCUMENTS

| CN | 205699787 U | 11/2016 |
| CN | 111204949 A | 5/2020 |

(Continued)

*Primary Examiner* — Christine J Skubinna
(74) *Attorney, Agent, or Firm* — FisherBroyles, LLP; Roger L. Browdy; Ronni S. Jillions (57) ABSTRACT

The invention relates to a method for removing a chemical substance from human excreta, such as faeces and urine, comprising the following steps of: providing a toilet for a person from whose excreta the chemical substance must be removed; releasably connecting a filtering device to the toilet, wherein the filtering device comprises at least one removable cartridge with a filter; transporting the excreta by means of a transport screw from the toilet toward the filter in the cartridge, wherein pressure is exerted on the excreta by means of a plunger; filtering the chemical substance out of the excreta in situ using the filtering device; periodically replacing the at least one cartridge; and processing the replaced cartridge. The invention also relates to a filtering device for application in this method, and a cartridge for use in such a filtering device.

22 Claims, 4 Drawing Sheets

(51) Int. Cl.
   *B01D 61/18* (2006.01)
   *B01D 61/20* (2006.01)
   *E03D 11/11* (2006.01)

(52) U.S. Cl.
   CPC ........ *E03D 11/11* (2013.01); *B01D 2201/302* (2013.01); *B01D 2313/44* (2013.01)

(56) References Cited

U.S. PATENT DOCUMENTS

| | | | | |
|---|---|---|---|---|
| 5,851,488 | A * | 12/1998 | Saul | G01N 21/645 |
| | | | | 422/67 |
| 2018/0055491 | A1* | 3/2018 | Hall | A47K 11/02 |
| 2018/0236407 | A1* | 8/2018 | Shevitz | C12M 41/38 |

FOREIGN PATENT DOCUMENTS

| | | | | | |
|---|---|---|---|---|---|
| KR | 2001035748 | A | * | 5/2001 | |
| KR | 20010035748 | A | | 5/2001 | |
| KR | 2017049730 | A | * | 5/2017 | ............ B01D 35/02 |
| KR | 20170049730 | A | | 5/2017 | |
| WO | WO-2008044806 | A1 | * | 4/2008 | ............ A47K 11/02 |

* cited by examiner

METHOD AND DEVICE FOR REMOVING A CHEMICAL SUBSTANCE FROM HUMAN EXCRETA

The invention relates to a method for removing a chemical substance from human excreta, such as faeces and urine, among other things. The invention also relates to a filtering device for use in the method, and a toilet comprising such a filtering device.

Such a method is known, particularly from the U.S. Pat. No. 6,317,900. In the method described therein human excreta are collected in a portable container which functions as a toilet, and transported to a central processing facility. Pharmaceutical substances present in the excreta are then isolated in the facility, and then destroyed.

Human excreta, for instance faeces and urine, also referred to as excrement, but also possible additional excreta such as vomit, blood, saliva and the like, are nowadays usually discharged into a sewage system with water from a flush toilet and transported over large distances to a sewage treatment plant. In the sewage treatment plant contaminated water is purified. Finally, discharge to the surface water takes place. Such a purification method is not efficient or effective for removing (all) chemical substances, such as medications, nor for recovering valuable chemical (additive) substances, particularly because the concentrations thereof are (very) low in practice.

The invention has for its object to provide a method for effectively removing chemical substances, particularly pharmaceutical substances, such as medications, from human excreta and/or personal hygiene materials (such as toilet paper and the like), and a method according to the invention has for this purpose the special feature that it comprises the following steps of:
 providing a toilet for a person from whose excreta and/or personal hygiene materials (such as toilet paper and the like) the chemical substance must be removed;
 releasably connecting a filtering device to the toilet, wherein the filtering device comprises at least one removable cartridge;
 transporting the excreta by means of a transport screw from the toilet toward a filter in the cartridge, wherein pressure is exerted on the excreta by means of a plunger;
 filtering the chemical substance out of the excreta and/or personal hygiene materials (such as toilet paper and the like) in situ using the filtering device;
 periodically replacing the at least one cartridge;
 processing the replaced cartridge.

In other words, the chemical substances, such as pharmaceutical substances or medications, are removed from the excreta locally, i.e. at the position of the toilet. This has the significant advantage that purification can take place more effectively and specifically than before, namely directly in the toilet where the concentration of the chemical substance in the toilet water is relatively high and the number of different chemical substances, such as medications, in the toilet water is relatively small. In the processing step the chemical substance is preferably isolated from the filtering device. The chemical substance can then be processed separately with a view to for instance separate storage, separate destruction and/or reuse.

It is noted that this method can be performed irrespective of the type of toilet, and so is not limited to a toilet of the type working with flushing water. With the exception of urinals, water/urine is preferably separated from the solid parts of the excreta before being treated. This method can moreover be applied in a toilet with and without sewer connection and in urinals.

It is also noted that the term chemical substance must be understood in its broadest sense, i.e. must be understood to mean any imaginable substance. The term chemical substance must be understood to mean at least, without limitations, biological and organic substances, for instance substances extracted at least partially from plants, animals, micro-organisms, fungi, viruses and/or bacteria, pharmaceutical substances and medications in general, chemical residual substances such as medical/pharmaceutical residual substances and (medical/pharmaceutical) residual substances partially metabolised by the human body, micropollutants, synthetic substances, radioactive substances, chemical elements and so on.

The plunger preferably forms part of the cartridge, and is more preferably releasable, i.e. releasable from the cartridge. In addition to exerting pressure on the excreta in the direction of the filter, the plunger can thus also function as cover for the cartridge. Such an embodiment also has the advantage that the plunger need not be cleaned, since it is always replaced together with the cartridge. When the plunger is also releasable from the cartridge, and so does not form a fixed part thereof, the plunger is able to compress together with the transport screw a greater volume. This means that the plunger is thereby displaceable over a longer path, corresponding to an outer end of the transport screw to which the plunger can be attached. In other words, this increases the stroke volume of the plunger.

The plunger preferably functions as cover of the cartridge after the step of filtering the chemical substance out of the excreta in situ using the filtering device has been performed, and preferably prior to replacement and processing of the filtering device formed by the cartridge.

Before transportation of the excreta the plunger is preferably coupled releasably to an outer end of the transport screw, and this coupling more preferably takes place by means of a coupling element situated at the outer end of the transport screw, wherein the coupling element is preferably electrically, magnetically, pneumatically or mechanically operative. The coupling element can for instance comprise an electric gripper. Use is therefore in each case made in the method of the same transport screw, but of a different plunger in each iteration of the method. The transport screw is of course preferably also replaceable, although this is not necessary for every iteration of the method. The coupling element preferably comprises gripping elements which are displaceable outward from the coupling element and are configured to engage on the plunger.

The plunger preferably forms a barrier between the transport screw and the excreta, and the barrier is here preferably a gas- and/or liquid-tight barrier. The transport screw hereby does not come into contact with the excreta, which is advantageous in respect of hygiene and maintenance requirements. This is because the transport screw is not affected by the excreta, and possible drive means of the transport screw and/or a transport screw housing are thereby not affected by the excreta either.

The toilet preferably comprises a receiving chamber for receiving the excreta, for instance after the excreta are flushed. The receiving chamber is preferably an elongate receiving chamber, and the transport screw is preferably configured to move in longitudinal direction of the elongate receiving chamber. The cartridge and the receiving chamber preferably form a joint processing chamber, preferably during the step of transporting the excreta. The receiving chamber, the cartridge and/or the joint processing chamber is preferably connected directly or indirectly to a vacuum pump so that the excreta moves by means of an underpressure to the receiving chamber, the cartridge and/or the joint processing chamber. The toilet more preferably comprises an excreta inlet which is connected directly or indirectly to the receiving chamber, the cartridge and/or the joint processing chamber.

The cartridge of the filtering device preferably comprises a readable code which is indicative of the chemical substance to be filtered out of the excreta, so that the replaced cartridge can be processed on the basis of the code. The code, for instance a colour code or barcode, then indicates how the filtering device is constructed or filled with a view to a specific application thereof (for instance capturing a specific medication or a group of medications). The code moreover provides the option of processing or reusing the cartridge of the filtering device and the specific medication or the group of medications, after being collected, in environmentally friendly manner.

In the case of a toilet that works with flushing water it is possible in the method to collect the filtered flushing water separately in a reservoir and to reuse it again as flushing water. The method can thus be applied to a toilet which is not connected to a sewer system and/or to a toilet without fixed water connection. An additional substance, such as a biocide or an odorant, is optionally added to the flushing water. Further options in the method are the addition of an oxidation step before or after filtration and/or air extraction or air treatment in the toilet.

In a preferred embodiment of a method according to the invention the chemical substance is filtered out of the excreta and/or personal hygiene materials (such as toilet paper and the like) immediately after use of the toilet by the person. The toilet is preferably personal for the duration of a hospitalization or treatment of a person, which makes it possible to separate specific chemical substances, such as specific medications, from the excreta per individual person.

In a subsequent preferred embodiment of a method according to the invention the chemical substance is filtered out of the excreta by means of chemical filtration, preferably by means of adsorption, and/or by means of physical filtration, preferably by means of UF/NF. In the latter case use is preferably made of a membrane, such as a UF/NF membrane. The membrane is preferably provided with a coating which is adapted to the chemical substance to be filtered. The mesh width and/or adsorption properties of the coating and/or the membrane are for instance adapted to the chemical substance to be filtered.

In an embodiment of the method according to the invention the filtering device comprises a first removable cartridge and a second removable cartridge, wherein solid parts of the excreta and possible personal hygiene products (toilet paper and the like) of the person are substantially removed by the first cartridge (for instance by means of filtering), and wherein substantially liquid parts (such as urine and possible flushing water) with the chemical substance are filtered by the second cartridge, such that the chemical substance is removed. In the first cartridge the excreta are preferably filtered by means of filtration. In the second cartridge the excreta, depending on the application (for instance which chemical substance must be removed), are preferably filtered on the basis of physical (for instance UF/NF) and/or chemical (for instance adsorption) principles. The first cartridge and the second cartridge are preferably each embodied individually as separately removable units. In an alternative the first cartridge and the second cartridge are embodied collectively as one removable unit. If the method makes use of a code, as discussed above, the code is preferably arranged at least on the second cartridge. In the case of urinals only urine, i.e. liquid excreta, need be filtered, so that one cartridge can in that case suffice, this preferably being said second cartridge.

The cartridge is preferably configured such that the excreta are first filtered by the first cartridge and are only then filtered by the second cartridge. The solid parts of the excreta, such as faeces, are hereby filtered (preferably sieved) by the first cartridge, and the liquid parts of the excreta, such as urine, are filtered by the second cartridge (preferably by means of adsorption). The residues of the filtering of the solid and liquid parts of the excreta can therefore be processed separately of each other. In the case that the chemical substances are medications the greatest part thereof will generally be filtered (preferably by means of adsorption) by the second cartridge. This can therefore be taken into consideration in the processing methods of respectively the first and the second cartridge.

In a method according to the invention use is made of pressing technique and optionally additionally vacuum technique for the transport of excreta to the filter. A toilet with transport to the filter on the basis of pressing technique is also referred to here as screw-action toilet. In a toilet of the latter type the excreta of the person are transported particularly by means of a transport screw of the toilet toward a filter in the (first) cartridge. A pressure in the direction of the filter is here exerted by means of the plunger which preferably forms part of the cartridge, and more preferably of the first cartridge. Provision can alternatively or additionally be made for the plunger to (also) form part of the toilet. The liquid excreta, such as urine and other fluids from the person and the possible flushing water, is then carried to the cartridge, preferably from the first cartridge to the second cartridge, and the pharmaceutical substance removed therefrom. The toilet can alternatively be embodied as a urine-diverting toilet, wherein the faeces and urine of a person are collected separately. For a urine-diverting toilet, the first cartridge is therefore preferably placed in the part of the urine-diverting toilet intended for faeces, and the second cartridge is preferably placed in the part of the urine-diverting toilet intended for urine. The replacement frequencies of the first and second cartridges can differ from each other, particularly in the case of a urine-diverting toilet.

The invention likewise relates to a filtering device, inter alia for use in a method according to the invention. This filtering device according to the invention comprises at least one removable cartridge with a filter, a transport screw and a plunger therein.

In an embodiment of the filtering device the plunger forms part of the cartridge and is preferably releasable. The plunger can here be releasably coupled to an outer end of the transport screw, for instance by means of a coupling element situated at the outer end of the transport screw. The coupling element can be an electrical, magnetic, pneumatic or mechanical coupling element. The coupling element can for instance comprise an electric gripper.

In a further embodiment of the filtering device the plunger can form a barrier between the transport screw and the excreta, and this barrier can be a gas- and/or liquid-tight barrier. The at least one cartridge can further comprise a readable code which is indicative of the chemical substance.

In yet another embodiment the filtering device comprises a first removable cartridge and a second removable cartridge, wherein the first cartridge is configured to filter solid parts of the excreta and the second cartridge is configured to filter liquid parts of the excreta with the chemical substance. The first and second cartridge can here be connected in series and the first cartridge can be placed upstream of the second cartridge. The first cartridge and the second cartridge can together form a removable unit, although it is also possible to envisage the first cartridge and the second cartridge each forming a separate removable unit.

The invention further relates to an individual, i.e. separate, toilet for use with a filtering device according to the invention. The toilet is preferably provided with specially developed software which communicates with the filtering device, i.e. the first and the second cartridges, so that only original cartridges can be used therein.

Finally, the invention also relates to an individual, i.e. separate, cartridge for a filtering device as described above. According to the invention, such a cartridge comprises a housing with an inlet for excreta, an outlet for a filtered liquid fraction, and filter material received in the housing between the inlet and the outlet. The filter material can comprise at least one sieve, at least one adsorption material or a dead-end membrane filter. Combinations of said filter materials can also be envisaged.

The invention will be further elucidated on the basis of figures shown in a drawing, wherein:

FIG. 3 shows three embodiments of a cartridge of a filtering device, wherein

Figure 1:
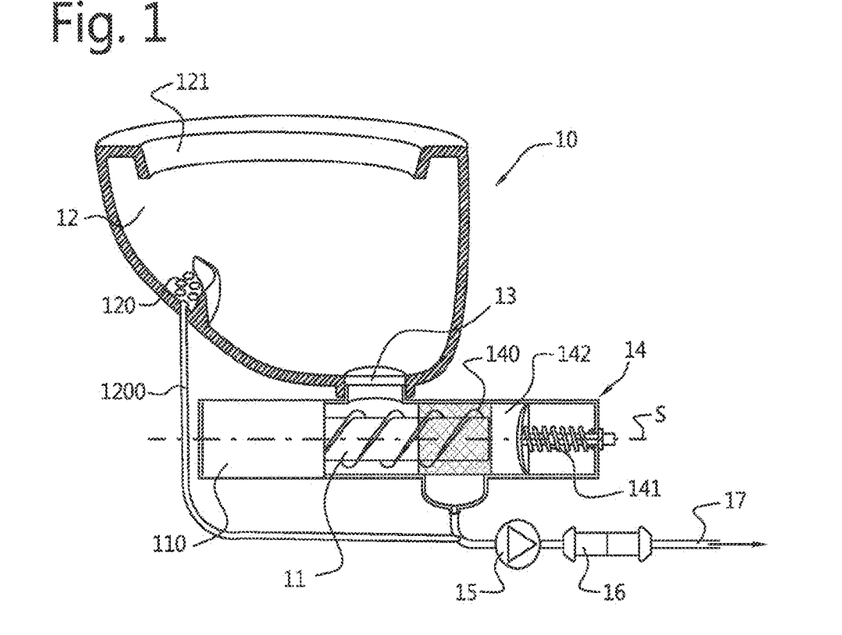
FIG. 1 shows a cross-section of a screw-action toilet with filtering device.

FIG. 1 shows a screw-action toilet 10, i.e. a toilet with a filtering device for excreta on the basis of pressing technique, wherein a screw conveyor 11 is mounted directly below toilet bowl 12. Toilet bowl 12 is connected to screw 11 by means of a closure 13 (such as a knife gate valve or pinch valve) or by means of a liquid seal (not shown). When they leave toilet bowl 12, the contents (not shown), such as excreta (urine, faeces and so on), toilet paper, flushing water or other materials that may be present, come to lie on the screw 11. Screw 11 then transports said contents by means of rotation about its screw axis S to a filtration zone. For rotation of screw 11 about its screw axis S a drive 110 is provided, this for instance being an electrical drive.

Filtering of a solid fraction of the contents, such as solid excreta such as faeces, takes place by means of a filter basket 140, which preferably forms part of a first cartridge 14. In order to maintain pressure on the filter 140 use is made of a pressure zone which is kept to pressure with a plunger 141 (such as a ballast spring). This plunger 141 is located at an outfeed end of screw 11 and acts in the opposite direction to screw conveyor 11. Said solid fraction of the contents, which is pressed toward plunger 141 with a greater pressure, will begin to fill a collecting part 142 of first cartridge 14. Then situated in the collecting part 142 is the solid fraction (such as faeces, toilet paper and other solid materials), which is stored there. The remaining liquid fraction, such as water and urine, is then carried along a second cartridge 16 by means of a (peristaltic) pump 15 or using vacuum technique (not shown), where the chemical substances, such as pharmaceutical substances, are removed therefrom. Dischargeable water then remains, which can be discharged via a water outfeed 17, for instance to a sewer or storage tank (not shown), or can be reused (not shown).

Toilet 10 can optionally be provided in toilet bowl 12 with a collecting element 120 for a liquid excreta fraction, such as urine. The liquid fraction can be carried directly to the second cartridge 16 by means of the connecting element 120 since it comprises no solid parts, such as faeces. A transport conduit 1200 can for instance be provided for this purpose. Toilet bowl 12 can further comprise a flushing mechanism (not shown) whereby flushing water can be carried into toilet bowl 12, for instance underneath an L-shaped flange 121 which is attached to toilet bowl 12 so that the flushing water does not splash upward toward the user of toilet 10.

Figure 2:
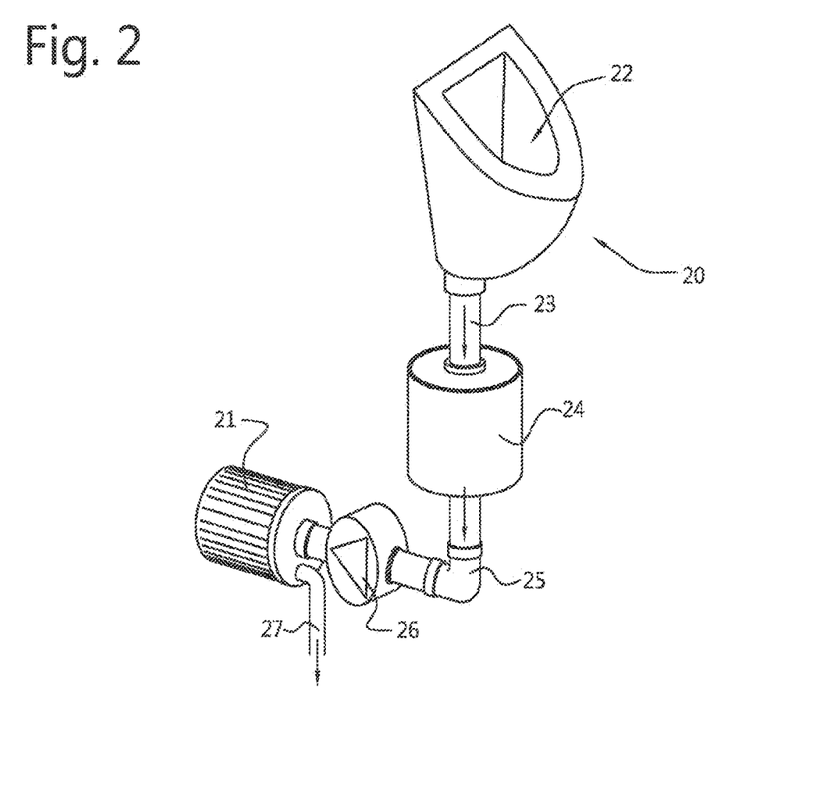
FIG. 2 shows a schematic perspective view of a urinal with filtering device.

FIG. 2 shows a urinal 20 which is provided with a second cartridge 21 for filtering a liquid fraction, such as urine and possible flushing water. The liquid fraction is deposited in the infeed 22 of urinal 20, from where the fraction finds its way via an infeed conduit 23 into a buffer tank 24, where the fraction is stored temporarily. Buffer tank 24 issues the fraction to a filter conduit 25 at a controlled flow rate by means of for instance a (peristaltic) pump 26 or vacuum technique (not shown). The liquid fraction is hereby carried at a controlled flow rate through the shown second cartridge 21, where possible chemical substances, such as pharmaceutical (residual) substances, are captured. After filtration and/or adsorption of the chemical substances from the liquid fraction by means of second cartridge 21 dischargeable water remains, which can be discharged or reused via an outfeed conduit 27.

It will be apparent that the toilets as described above are not limited to the above described embodiments. The peristaltic pump can for instance be replaced by vacuum technique in both the screw-action toilet and in the urinal. Toilet bowls 12, 22 can also be replaced by vacuum systems, wherein for the screw-action toilet the screw 11 and cartridge 14 are replaced by a particle filtration device on the basis of vacuum technique.

Figure 3A:
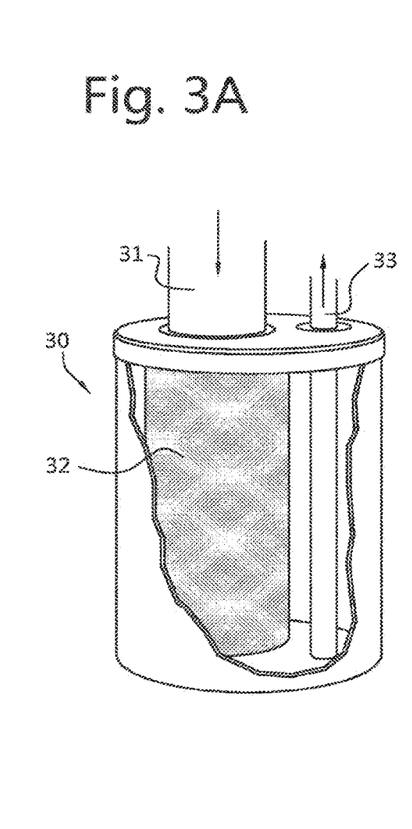
FIG. 3a shows a particle filter cartridge for use in a vacuum toilet.
Figure 3B:
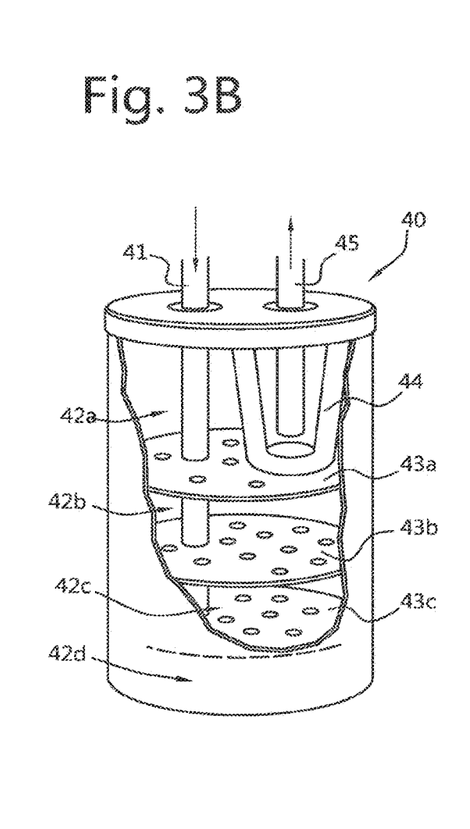
FIG. 3b shows an adsorption filter cartridge and FIG. 3c shows a dead-end membrane filter cartridge.
Figure 3C:
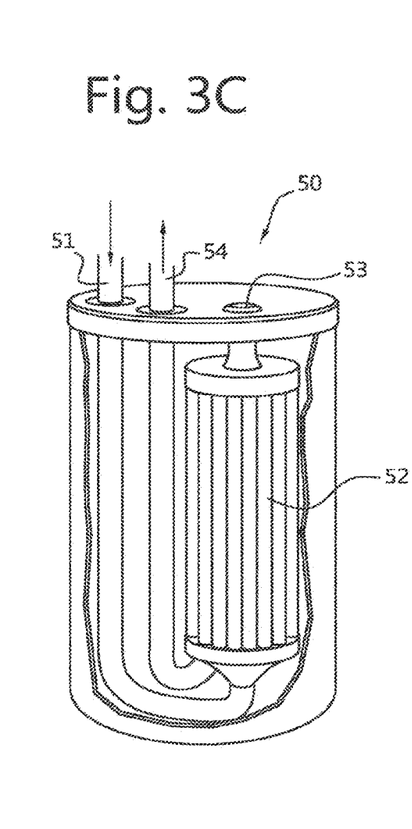

FIG. 3 shows three embodiments of a cartridge for use in a filtering device. FIG. 3a shows an embodiment on the basis of particle filtration, FIG. 3b shows an embodiment on the basis of adsorption columns, and FIG. 3c shows an embodiment on the basis of dead-end membrane filtration. These embodiments are further elucidated hereinbelow. It is noted that the form and structure of the cartridges described below is not limited to the shown embodiments, and that combinations of the three embodiments are also possible.

FIG. 3a shows a first filter cartridge 30. This filter cartridge 30 is particularly a filter cartridge 30 on the basis of particle filtration, i.e. sieving. This comprises an inlet 31 through which the material to be filtered (not shown), such as excreta and possible personal hygiene materials (such as toilet paper and the like), possibly flushing water, and the like, is carried into filter cartridge 30. The material comes to lie via inlet 31 in filter basket 32, where solid particles are filtered/obstructed from the material by the structure of filter basket 32. Possible liquid parts of the material which remain after filtration can then, from filter cartridge 30 and via an outlet 33, be discharged, reused or carried to a subsequent filter 30, 40, 50 coupled to the outlet 33, for instance a filter 40, 50 as shown in FIGS. 3b and 3c. Filter basket 32 can be configured to filter particles having a predetermined particle diameter. The particle diameter can be selected for a specific application. It is also possible to envisage that filter basket 32 consists partially or wholly from one or more membranes (not shown), wherein substances can for instance be filtered at molecular level. Filter cartridge 30 is preferably used in a vacuum toilet. Filter cartridge 30 is preferably configured such that it can be removed from the toilet for replacement. Filter cartridge 30 can take a (partially) reusable, (partially) biodegradable and/or (partially) disposable form.

FIG. 3b shows a second filter cartridge 40. This filter cartridge 40 is particularly a filter cartridge 40 on the basis of adsorption. This comprises an inlet 41 through which the material to be filtered (not shown), such as excreta, is carried into filter cartridge 40. Filter cartridge 40 preferably comprises a plurality of compartments 42a-d which are mutually separated by adsorption materials 43a-c. Adsorption materials 43a-c can be the same as or different from each other. When adsorption materials 43a-c differ from each other, a different chemical substance (not shown) can for instance be filtered out of the material to be filtered per compartment 42a-d. An example of an adsorption material 43 is for instance active carbon. Inlet 41 preferably first carries the material to be filtered to the lower compartment 42d, i.e. the compartment furthest removed from a side of filtering device 40 where inlet 41 enters the filtering device. By means of a pressure or vacuum exerted on the material to be filtered the material to be filtered rises from compartment 42d to compartment 42c, from there to compartment 42b, and so on to the upper compartment 42a. During this process the material to be filtered is filtered by each of the adsorption materials 43a-c by means of at least adsorption. It is also possible for the adsorption materials 43a-c to additionally comprise a particle filtration function so that solid particles from the material to be filtered remain behind in a determined compartment 42a-d. Preferably arranged in upper compartment 42a is a candle filter 44 which sieves a solid fraction from the material to be filtered. Candle filter 44 also ensures that adsorption materials 43a-c are not flushed out of the filter cartridge 40. The material to be filtered is once again carried through candle filter 44 by means of a pressure or vacuum exerted on the material to be filtered. Arranged in candle filter 44 is an outlet 45 of filter cartridge 40, via which the liquid fraction filtered by the adsorption materials 43a-c and the candle filter 44 is discharged or reused. Filter cartridge 40 is preferably configured such that it can be removed from the toilet for replacement. Filter cartridge 40 can take a (partially) reusable, (partially) biodegradable and/or (partially) disposable form.

FIG. 3c shows a third filter cartridge 50. This filter cartridge 50 is particularly a filter cartridge 50 on the basis of dead-end membrane filtration. In dead-end membrane filtration the material to be filtered is forced through the membrane substantially perpendicularly thereof by means of pressure or vacuum on the material to be filtered. Depending on the structure of the membrane, molecules/particles greater than a mesh width of the membrane are filtered out of the material to be filtered. Filter cartridge 50 comprises an inlet 51 through which the material to be filtered (not shown), such as liquid excreta, such as urine, is carried into filter cartridge 50. Inlet 51 debouches into a membrane filter 52, such as a UF/NF-cylinder ("Ultra-Filtration/Nano-Filtration"). The material to be filtered is forced through membrane filter 52 by a pressure or vacuum exerted thereon. Membrane filter 52 is preferably filled with water prior to filtration of material. Membrane filter 52 therefore preferably comprises a venting element 53 configured to emit gases (such as air) which may be present in filter cartridge 50. When the material to be filtered has been carried through membrane filter 52 what remains is mainly water, which can be discharged or reused via an outlet 54 of filter cartridge 50. Filter cartridge 50 is preferably configured such that it can be removed from the toilet for replacement. Filter cartridge 50 can take a (partially) reusable, (partially) biodegradable and/or (partially) disposable form.

Figure 4:
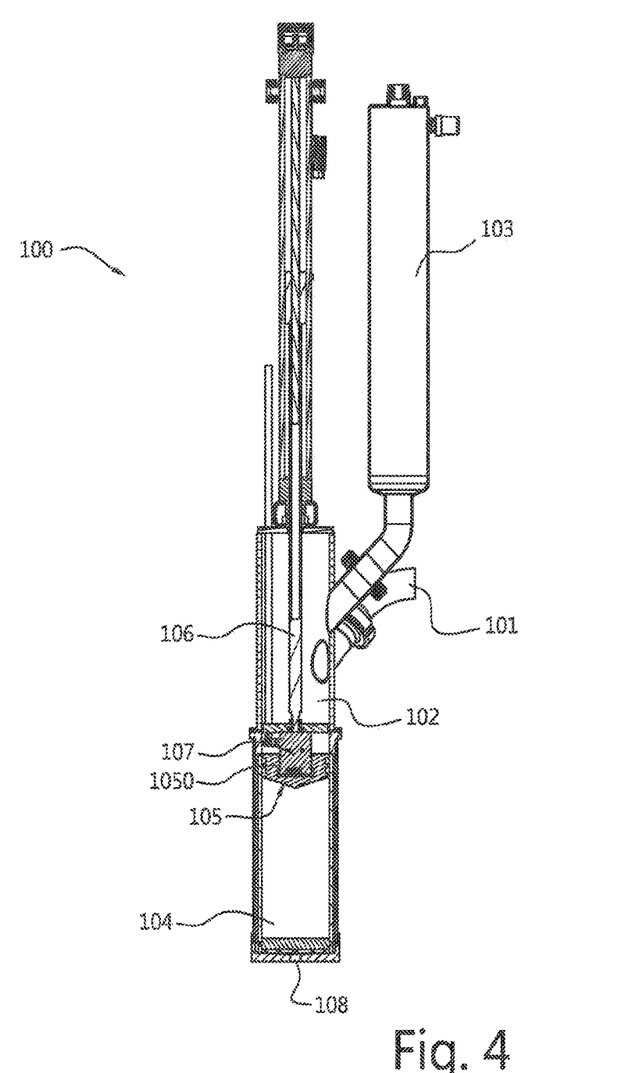
FIG. 4 shows a cross-section of a preferred embodiment of a filtering device on the basis of pressing technique for a toilet on the basis of vacuum technique in a situation where a filter cartridge is being coupled to a screw conveyor or is being uncoupled.

FIG. 4 shows a preferred embodiment of a filtering device 100 on the basis of pressing technique for a toilet (not shown here) on the basis of vacuum technique. The toilet is coupled to filtering device 100 via an inlet 101, which connects the toilet to a receiving chamber 102. A vacuum chamber 103 is connected to receiving chamber 102 for the purpose of creating an underpressure in receiving chamber 102. Vacuum chamber 103 can consist of several parts, such as a plurality of connected or separate vacuum chambers. Vacuum chamber 103 is preferably connected to a vacuum pump. When the toilet is flushed, the excreta are thus transported via processing inlet 101 into receiving chamber 102 by means of the underpressure created in receiving chamber 102.

Referring to FIG. 4, a releasable cartridge 104 is placed adjacently of receiving chamber 102. Cartridge 104 comprises a plunger head 105 which is therefore placed together with cartridge 104 in filtering device 100. When placed, plunger head 105 lies adjacently of receiving chamber 102. This means that the side of plunger head 105 remote from the inner space of cartridge 104 here lies directly adjacently of the inner space of receiving chamber 102. A cross-sectional form of the inner space of receiving chamber 102 is preferably substantially the same as a cross-sectional form of the inner space of cartridge 104. The two cross-sectional forms are preferably circular. A cross-sectional form of plunger 105 corresponds with the cross-sectional forms so that plunger 105 is able to move between receiving chamber 102 and cartridge 104, while the peripheral edge of plunger 105 maintains contact with the inner walls of respectively receiving chamber 102 and cartridge 104 during displacement. The peripheral edge of plunger 105 is preferably provided with a resilient material, such as rubber, so that plunger 105 forms a gas- and/or liquid-tight barrier between the spaces on the one and the other side of plunger 105.

After cartridge 104 is placed in filtering device 100 it can be taken into use. For this purpose filtering device 100 comprises a transport screw 106 which can move in longitudinal direction of receiving space 102 and cartridge 104. Transport screw 106 comprises at an outer end thereof a gripper 107 which is configured to engage on the plunger 105 of cartridge 104. After engagement by gripper 107 the plunger 105 can be released from cartridge 104, for instance by means of a helical movement or a snapping movement of plunger 105 relative to cartridge 104. Plunger 105 preferably comprises a recess 1050 for receiving gripper 107. Gripper 107 preferably comprises gripping elements which can extend outward from gripper 107 and can make contact with the recess 1050 of plunger 105.

Figure 5:
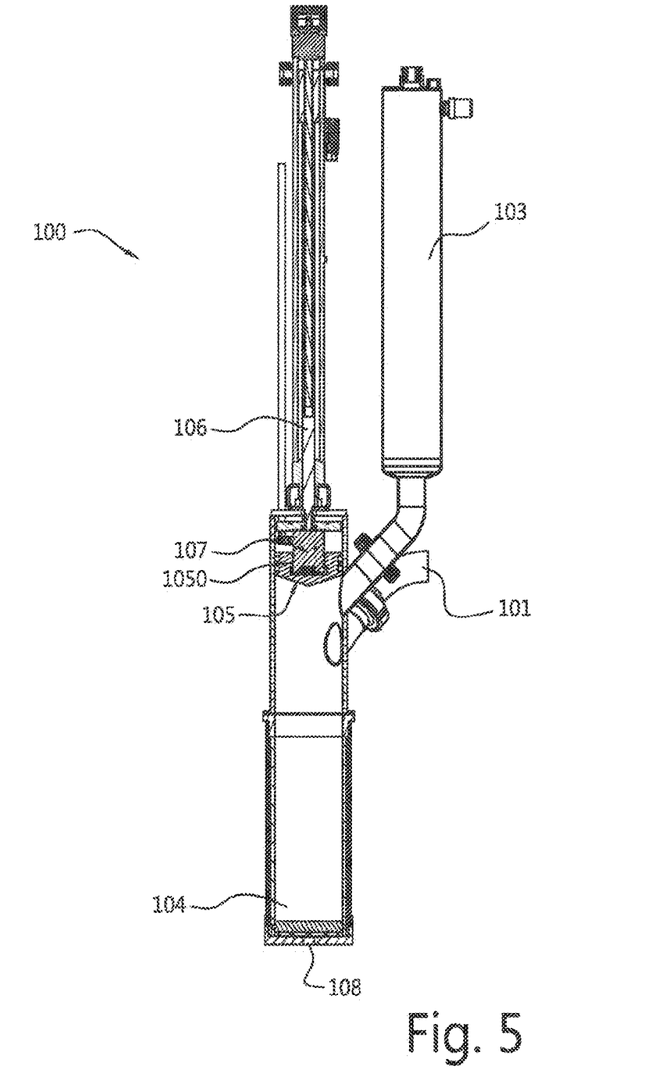
FIG. 5 shows a view corresponding with FIG. 4 in which the filtering device is ready to receive excreta.

After placing of cartridge 104 the transport screw 106 moves in the direction of cartridge 104 so that gripper 107 can remove plunger 105 from cartridge 104. Transport screw 106 then moves in opposite direction, away from cartridge 104. When plunger 105 has been removed from cartridge 104, the inner spaces of receiving chamber 102 and cartridge 104 form a joint space. In a receiving state of filtering device 100, in which device 100 is ready to receive and process excreta, plunger 105 has been positioned all the way at the top of receiving chamber 102 by transport screw 106 so that inlet 101 and vacuum chamber 103 are in contact with the joint space (FIG. 5). This position can be detected by for instance a sensor or switch, after which the toilet can be released for use.

When filtering device 100 is in the receiving state, the toilet can be flushed, wherein vacuum chamber 103 provides together with receiving chamber 102 and cartridge 104 for suctioning of the excreta to receiving chamber 102 and cartridge 104. After flushing, transport screw 106 moves plunger 105 toward cartridge 104 and the filter positioned therein (not shown here). Plunger 105 thereby exerts pressure on the excreta in the direction of the filter. As mentioned above, the filter can consist of two parts, such as for instance a first filter (optionally formed by a first cartridge) for filtering a solid fraction of the excreta, and a second filter (optionally formed by a second cartridge) for filtering a liquid fraction of the excreta.

When use of the toilet has finished, or when cartridge 104 has reached its maximum capacity for excreta and/or filtering, cartridge 104 is closed by means of plunger 105 and transport screw 106 is uncoupled from plunger 105. Cartridge 104 can then be removed from filtering device 100 together with plunger 105, which then serves as a cover for cartridge 104.

In the preferred embodiment of filtering device 100 in FIG. 4 the filtering device 100 is placed vertically. The orientation of filtering device 100 is of course variable because of the use of vacuum technique. It is also possible to provide an embodiment of the filtering device 100 wherein use it is not made of vacuum technique. The excreta can here for instance be transported to receiving chamber 102 by means of gravity, or other techniques known to the skilled person.

In the shown embodiment an outlet 108 is provided on the underside of cartridge 104, i.e. the side of cartridge 104 remote from receiving chamber 102. The liquid fraction of the excreta can leave filtering device 100 via outlet 108 after being filtered by cartridge 104. The outlet 108 can for instance be coupled to a sewer or to a second cartridge for further filtering of the liquid fraction. The outlet 108 can otherwise also be placed elsewhere in cartridge 104.

The filtering device 100 as shown in FIGS. 4 and 5 can be widely applied, for different forms of excreta. It possible here to envisage faeces, urine, as well as vomit and the like.

It is noted that the above described drawings show only exemplary embodiments and must not be interpreted as limitation of the scope of protection of the appended claims. The different components shown here can thus be applied alone or in assemblies other than those shown here. The claims must be interpreted as standing alone, wherein this description functions merely as elucidation.

The invention claimed is:

1. A method for removing a chemical substance from human excreta, comprising the following steps of:
providing a toilet for a person from whose excreta the chemical substance must be removed;
releasably connecting a filtering device to the toilet via an inlet which connects the toilet to a receiving chamber of the filtering device, wherein the filtering device comprises at least one removable cartridge with a filter and a plunger wherein the cartridge is placeable adjacently to the receiving chamber, wherein the filtering device further comprises a transport screw that is releasably connectable to the plunger at an outer end thereof by a gripper and wherein the transport screw is movable in a longitudinal direction of the receiving chamber and the cartridge when the cartridge is placed adjacent to the receiving chamber;
transporting, when the cartridge is placed adjacent to the receiving chamber, the excreta from the receiving chamber to the filter in the cartridge by exerting pressure on the excreta by the plunger in the direction from the receiving chamber towards the cartridge, wherein the plunger is connected to the outer end of the transport screw, wherein the transport screw drives the plunger by moving in the longitudinal direction of the receiving chamber and the cartridge, wherein the plunger forms a barrier between the transport screw and the excreta;
filtering the chemical substance out of the excreta in situ using the filter in the cartridge;
periodically replacing the at least one cartridge, wherein the replacing the at least one cartridge comprises covering the cartridge with the plunger, releasing the plunger from the transport screw, and removing the cartridge comprising the filtered chemical substance; and
processing the replaced cartridge.

2. The method according to claim 1, wherein the gripper is electrically, magnetically, pneumatically or mechanically operative.

3. The method according to claim 1, wherein the barrier is a gas- and/or liquid-tight barrier.

4. The method according to claim 1, wherein the at least one cartridge comprises a readable code which is indicative of the chemical substance, and wherein the replaced cartridge is processed on the basis of the code.

5. The method according to claim 1, further comprising the step of isolating the chemical substance from the filtering device.

6. The method according to claim 1, wherein the chemical substance is filtered out of the excreta immediately after use of the toilet by the person.

7. The method according to claim 1, wherein the chemical substance is filtered out of the excreta by chemical filtration.

8. The method according to claim 1, wherein the chemical substance is filtered out of the excreta by physical filtration.

9. The method according to claim 7, wherein use is made of a membrane.

10. The method according to claim 1, wherein the filtering device comprises a first removable cartridge and a second removable cartridge, wherein solid parts of the excreta of the person are filtered by the first cartridge and wherein liquid parts of the excreta with the chemical substance are filtered by the second cartridge.

11. The method according to claim 10, wherein the excreta are first filtered by the first cartridge and are only then filtered by the second cartridge.

12. The method according to claim 10, wherein the first cartridge and the second cartridge are removed collectively after use or wherein the first cartridge and the second cartridge are each removed separately after use.

13. The method according to claim 1, wherein a vacuum toilet is provided as toilet.

14. The method according to claim 10, wherein urine of the person is carried from the first cartridge to the second cartridge.

15. A filtering device for use in the method according to claim 1, comprising a receiving chamber with an inlet for connecting the filtering device to a toilet, at least one removable cartridge with a filter, a plunger, and a transport screw,
wherein the cartridge is placeable adjacently to the receiving chamber, wherein the transport screw is releasably connectable to the plunger at an outer end thereof by a gripper, wherein the transport screw is movable in a longitudinal direction of the receiving chamber and the cartridge when the cartridge is placed adjacent to the receiving chamber, wherein the filtering device is configured to, when the cartridge is placed adjacent to the receiving chamber, transport the excreta from the receiving chamber to the filter in the cartridge by exerting pressure on the excreta by the plunger in the direction from the receiving chamber towards the cartridge by driving the plunger with the transport screw, wherein the plunger forms a barrier between the transport screw and the excreta, and wherein the filtering device is configured to allow periodic replacing of the at least one cartridge by covering the cartridge with the plunger, releasing the plunger from the transport screw and removing the cartridge comprising the plunger and the filtered chemical substance.

16. The filtering device according to claim 15, wherein the gripper is an electrical, magnetic, pneumatic or mechanical gripper.

17. The filtering device according to claim 15, wherein the barrier is a gas- and/or liquid-tight barrier.

18. The filtering device according to claim 15, wherein the at least one cartridge comprises a readable code which is indicative of the chemical substance.

19. The filtering device according to claim 15, wherein the filtering device comprises a first removable cartridge and a second removable cartridge, wherein the first cartridge is configured to filter solid parts of the excreta and the second cartridge is configured to filter liquid parts of the excreta with the chemical substance.

20. The filtering device according to claim 19, wherein the first and second cartridge are connected in series and the first cartridge is placed upstream of the second cartridge.

21. The filtering device according to claim 15, wherein the first cartridge and the second cartridge together form a removable unit, or wherein the first cartridge and the second cartridge each form a separate removable unit.

22. A toilet comprising the filtering device according to claim 15.

* * * * *